UNITED STATES PATENT OFFICE.

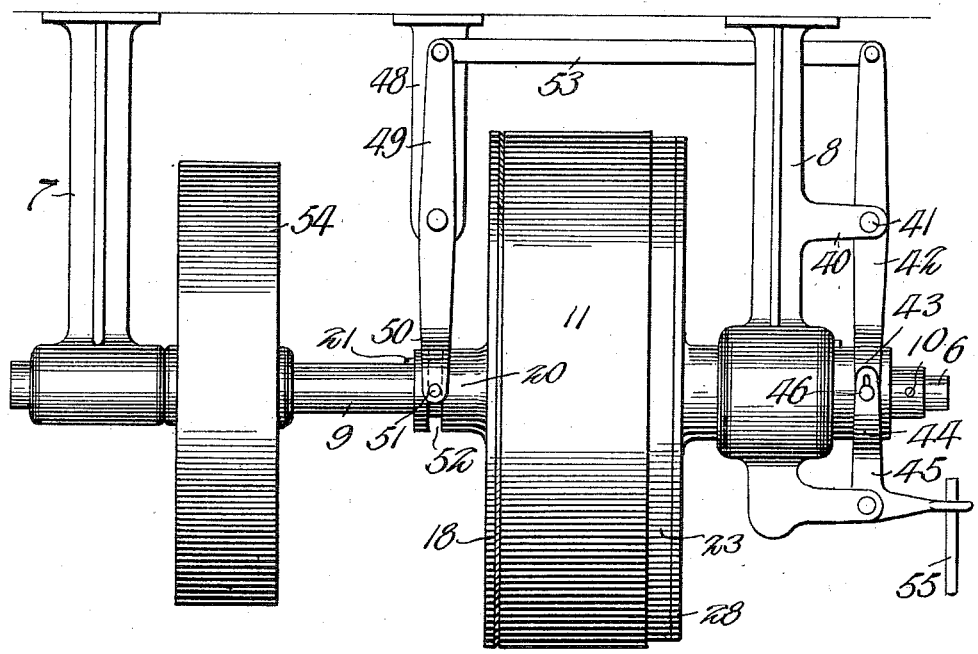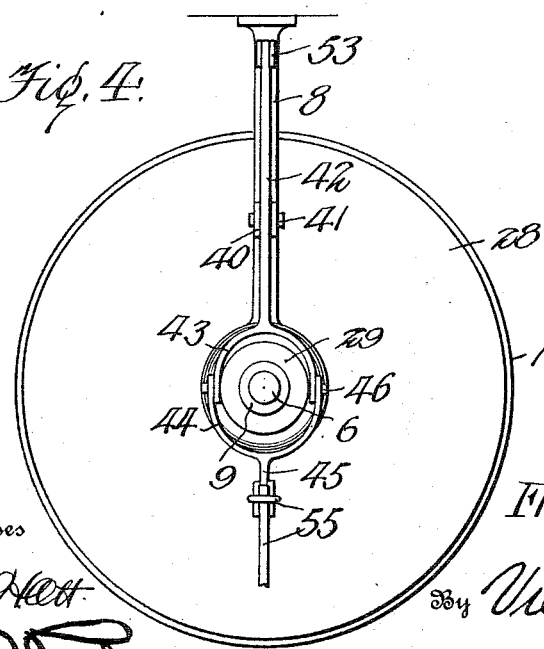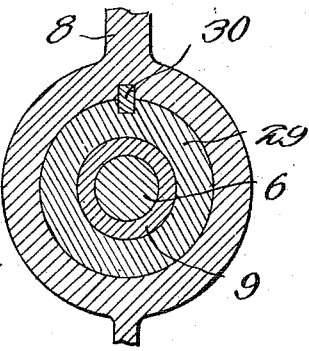

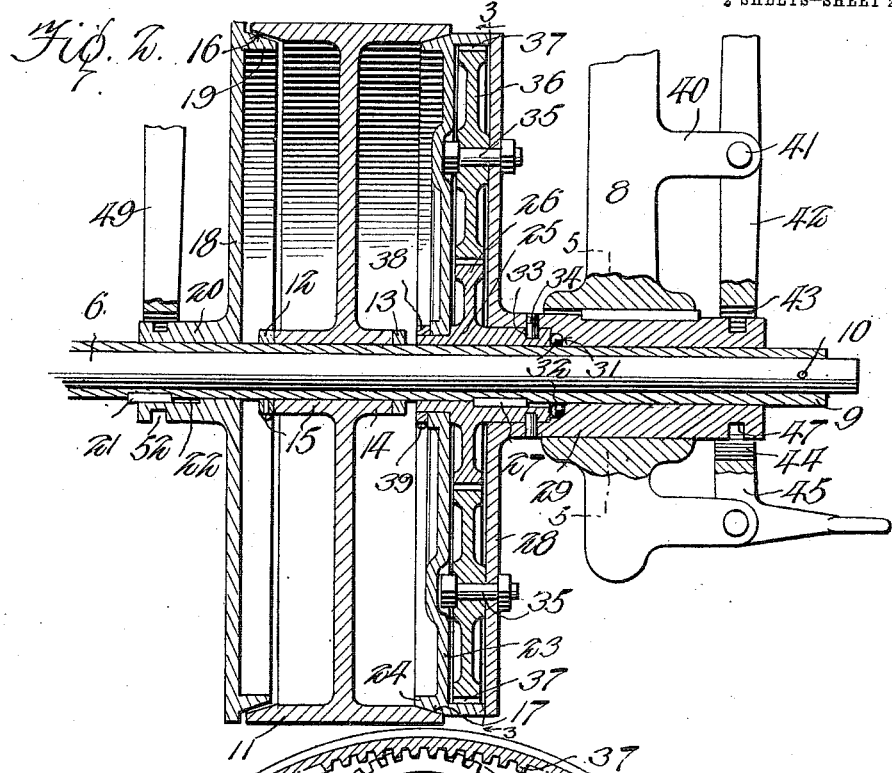
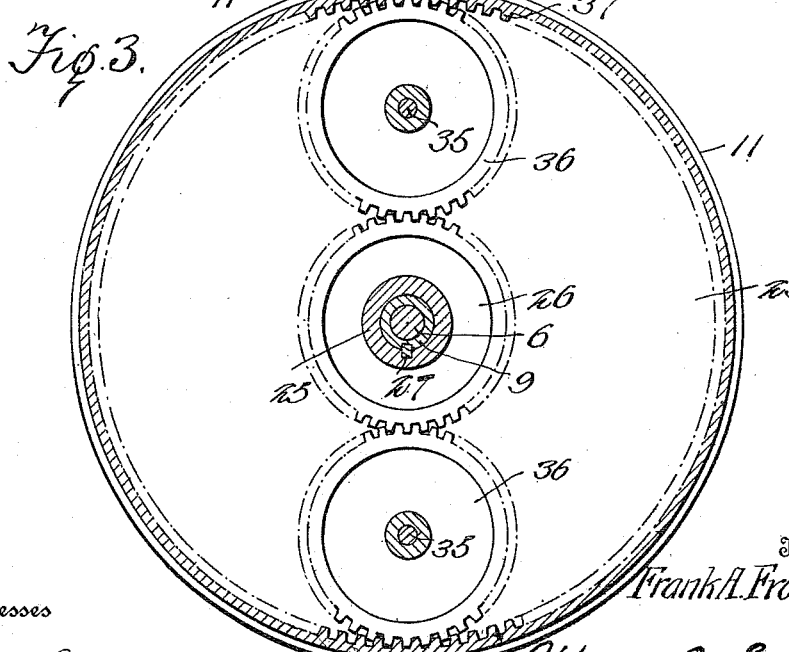

FRANK A. FROEHLICH, OF PHILADELPHIA, PENNSYLVANIA.

REVERSING-GEAR MECHANISM.

994,739.  Specification of Letters Patent.  Patented June 13, 1911.

Application filed December 3, 1910. Serial No. 595,417.

*To all whom it may concern:*

Be it known that I, FRANK A. FROEHLICH, a citizen of the United States, residing at Philadelphia, in the county of Philadelphia and State of Pennsylvania, have invented new and useful Improvements in Reversing-Gear Mechanism, of which the following is a specification.

The invention relates to a reversing gear, and more particularly to the class of gear mechanism for reversing counter shafts of lathes or other different machinery.

The primary object of the invention is the provision of gear mechanism of this character in which a counter shaft may be driven in reverse directions without requiring the shifting of the drive belt, thus obviating the necessity of a belt shifter.

Another object of the invention is the provision of reverse gear mechanism in which a belt pulley may be revolved in a reverse direction to its supporting shaft, thereby enabling a counter shaft to be driven by means of a belt connection between the pulley and the said shaft, whereby the said counter shaft may be rotated in reverse direction when the occasion requires.

A further object of the invention is the provision of a reversing gear mechanism in which a pulley or other revoluble member may be driven in opposite directions, without the intervention of belt shifters or other similar devices.

A still further object of the invention is the provision of reversing gear mechanism of this character in which internal and external gears are employed with intermediate differential gears, the differential gears being held stationary while in operation, so that the rotation of one gear in one direction will effect a rotation in the opposite direction of the other gear, thereby enabling machinery to be driven in either direction through the medium of a drive shaft rotating in one direction.

A still further object of the invention is the provision of mechanism of this character which is simple in construction, thoroughly reliable and efficient in operation, and that may be readily and easily operated, without possibility of accidents in the manipulation thereof.

With these and other objects in view, the invention consists in the construction, combination, and arrangement of parts, as will be hereinafter more fully described, illustrated in the accompanying drawings, and pointed out in the claims hereunto appended.

In the drawings: Figure 1 is a side elevation of the reverse gear mechanism constructed in accordance with the invention. Fig. 2 is a vertical longitudinal sectional view through the same. Fig. 3 is a sectional view on the line 3—3 of Fig. 2. Fig. 4 is an end elevation of the reverse gear mechanism. Fig. 5 is a sectional view on the line 5—5 of Fig. 2.

Similar reference characters indicate corresponding parts throughout the several views of the drawings.

Referring to the drawings by numerals, 6 designates a counter shaft, the same being rotatably supported in suitable hangers 7 and 8, which are fixed to a ceiling beam or other support in the ordinary well-known manner, and surrounding the shaft 6 is a sleeve 9, the same being fixed thereon by means of binding screws 10, whereby the said sleeve will rotate with the shaft when the same is being driven. However, the said sleeve 9 may be keyed to the shaft 6, if found desirable.

Between the hangers 7 and 8 and loosely journaled for free rotation upon the sleeve 9 is a pulley 11, over which is adapted to be trained at its periphery, a drive belt (not shown), the pulley 11 being held against longitudinal displacement on the sleeve 9 by means of collars 12 and 13, respectively, the same working against opposite ends of the hub 14 of said pulley, the collar 12 being fixed upon the sleeve 9 by means of a binding screw 15, and also the collar 13 is held fast thereon. This pulley 11 is provided with opposed internal clutch surfaces 16 and 17, respectively, which are engaged by clutch elements, as will be hereinafter more fully described.

At one side of the pulley 11 is arranged one of the friction clutch elements, comprising a disk 18, the same being formed on one face with an annular clutch perimeter flange 19 which is adapted to be moved into frictional engagement with the internal clutch surface 16 on the pulley 11, the disk 18 being provided with a hub 20 surrounding the sleeve 9 and carrying the usual key 21 engaging in a groove 22, thus locking the hub to the sleeve 9 but permitting it to be moved longitudinally thereon for bringing the disk 18 toward and away from the pulley 11 for the engagement of the clutch flange 19 with the internal clutch surface 16 of the pulley and its disengagement therefrom, for a purpose, as will be hereinafter more fully described. At the opposite side of the pulley 11 is arranged the other friction clutch element, comprising a disk 23 provided with a perimeter friction clutch flange 24, adapted for engagement with and disengagement from the internal clutch surface 17 of the pulley, the disk 23 being loosely mounted for rotation upon the hub 25 of a pinion 26, said hub 25 being splined by means of a key 27 to the sleeve 9, whereby the said pinion 26 will simultaneously rotate with the counter shaft 6, but is capable of longitudinal movement upon the sleeve 9 supported thereby. When the pinion 26 is longitudinally moved upon the sleeve 9, it carries with it the disk 23, thus the latter may be shifted into and out of engagement with the pulley 11.

Loosely mounted upon the hub 25 of the pinion 26, contiguous the disk 23, is a circular head 28, the same being formed with an elongated hub 29, the same surrounding the sleeve 9 and extending within the hanger 8, between it and the said sleeve 9, the hub 29 being keyed, as at 30, in the said hanger 8, whereby the hub 29 and its circular head 28 may be longitudinally shifted upon the sleeve simultaneously with the pinion 26 and the friction clutch disk 23, for the engagement of latter with and its disengagement from the pulley 11. Interposed between the hub 25 of the pinion 26 and the shoulder 31 formed on the hub 29 of the circular head 28 are bearing balls 32, whereby friction is reduced between the said hubs when one is rotated within the other. Formed in the hub 25 of the pinion 26 is an annular groove 33 in which loosely engage screws 34 threaded in the said hub 29, thus locking the hub 25 with the hub 29 for independent rotation thereof, but against longitudinal displacement with respect to the said hub 29.

Suitably mounted in the circular head 28 are stud journals 35 on which are rotatably supported differential gears 36, the same meshing with the pinion 26 and also with an internal gear 37 fixed to the disk 23, the differential gears 36 being adapted to rotate the disk 23 in a reverse direction to the rotation of the counter shaft, so that on driving the pulley 11 in one direction when the disk is clutched thereto, the counter shaft 6 will be driven in a reverse direction, as will be clearly obvious.

Surrounding the hub 25 at its inner end is a collar 38, the same being fixed to the said hub 25 by means of a set screw 39, and this collar is adapted to hold the disk 23 against displacement on the said hub 25 of the pinion 26 when the latter is being shifted in a manner, as will be hereinafter more fully described.

Formed integral with the hanger 8 and projecting laterally therefrom is a bearing ear 40, to which is connected by means of a pivot 41 a rocking lever 42, the same being provided with a forked lower end 43 which is pivotally connected to the forked end 44 of a bell crank lever 45, the pivot 46 connecting the said levers 42 and 45 being engaged in an annular groove 47 formed in the outer end of the hub 29, so that upon operating the said bell crank lever 45, the said hub 29 may be shifted longitudinally on the sleeve 9 within the hanger 8, whereby the clutch disk 23 may be moved toward and away from the pulley 11 for the clutching and unclutching thereof.

Secured to the ceiling beam between the hangers 7 and 8 is a further hanger or bearing 48, with which is pivotally connected a rocking lever 49, the same being provided with a forked lower end 50 carrying inwardly extending lugs 51 engaging in an annular groove 52 formed in the hub 20 of the clutch disk 18. The opposite end of the rocking lever 49 has pivotally connected thereto a link 53, the same being also pivotally connected to the rocking lever 42, so that when the latter is moved, simultaneously movement will be imparted to the rocking lever 49, whereby one of the clutch elements will be thrown out of engagement with the pulley wheel 11 when the other clutch element is thrown into engagement therewith, thus reverse movement may be alternately transmitted to the pulley 11 from the counter shaft 6, which latter rotates in one direction and is driven through the medium of a band wheel 54 fixed thereto in the usual well-known manner.

Connected with the bell crank lever 45 is an operating rod 55, which may be actuated in any suitable manner for operating the clutch elements, whereby the same may be moved into and out of engagement with the pulley 11 for reversing the movement thereof.

What is claimed is:

1. The combination with a shaft, of a pulley loosely mounted upon said shaft, means holding the pulley against longitudinal displacement on said shaft, disk clutch elements disposed at opposite sides of the pulley, one of said clutch elements being splined to the shaft, a pinion splined to said shaft and loosely supporting the other clutch element, a circular head loosely connected with the pinion, means holding the said circular head against rotation, an internal gear fixed to the clutch element loosely supported upon the pinion, differential gears carried by said circular head and meshing with the internal gear and pinion, respectively, and means connected with the circular head at one side of the pulley and the clutch element at the other side thereof, whereby the same may be simultaneously moved.

2. The combination with a shaft, of a pulley loosely mounted upon said shaft, means holding the pulley against longitudinal displacement on said shaft, disk clutch elements disposed at opposite sides of the pulley, one of said clutch elements being splined to the shaft, a pinion splined to said shaft and loosely supporting the other clutch element, a circular head loosely connected with the pinion, means holding the said circular head against rotation, an internal gear fixed to the clutch element loosely supported upon the pinion, differential gears carried by said circular head and meshing with the internal gear and pinion, respectively, means connected with the circular head at one side of the pulley and the clutch element at the other side thereof whereby the same may be simultaneously moved, and means for operating the said last-named means.

3. The combination with a driven shaft, of a pulley loosely journaled thereon, clutch elements disposed at opposite sides of the said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, and means for simultaneously moving the clutch elements for alternate engagement with and disengagement from the pulley.

4. The combination with a driven shaft, of a pulley loosely journaled thereon, clutch elements disposed at opposite sides of the said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, means for simultaneously moving the clutch elements for alternate engagement with and disengagement from the pulley, and means operating said last-named means.

5. The combination with a driven shaft, of a pulley loosely journaled thereon, clutch elements disposed at opposite sides of the said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, means for simultaneously moving the clutch elements for alternate engagement with and disengagement from the pulley, means operating said last-named means, and hangers supporting said shaft.

6. The combination with a driven shaft, of a pulley loosely journaled thereon, clutch elements disposed at opposite sides of the said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, means for simultaneously moving the clutch elements for alternate engagement with and disengagement from the pulley, means operating said last-named means, hangers supporting said shaft, and means connecting the said circular head with one of said hangers, whereby the said head may be moved longitudinally on the shaft.

7. The combination with a driven shaft, of a pulley loosely journaled thereon, clutch elements disposed at opposite sides of said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, means for simultaneously moving the clutch elements for alternate engagement with and disengagement from the pulley, means operating said last-named means, hangers supporting said shaft, means connecting the said circular head with one of said hangers, whereby the said head may be moved longitudinally on the shaft, and antifriction means interposed between the pinion and the stationary head.

8. The combination with a driven shaft, of a pulley loosely journaled thereon, clutch elements disposed at opposite sides of the said pulley and supported by said shaft, a pinion loosely connected with one of said clutch elements, means slidably connecting the pinion and one of said clutch elements to the shaft for rotation therewith, a stationary circular head carried by said pinion, differential gears journaled on said circular head and meshing with the pinion, an internal gear formed on the clutch element carried by the pinion and meshing with said differential gears, means for simultaneously moving the clutch elements for alternate engagement with and disengagement from the pulley, means operating said last-named means, hangers supporting said shaft, means connecting the said circular head with one of said hangers, whereby the said head may be moved longitudinally on the shaft, anti-friction means interposed between the pinion and the stationary head, and means loosely connecting the pinion with the stationary head, whereby the said pinion may rotate independently of the head.

In testimony whereof I affix my signature in presence of two witnesses.

FRANK A. FROEHLICH.

Witnesses:
JULIANNA FROEHLICH,
MATHIAS FINK.

---

Copies of this patent may be obtained for five cents each, by addressing the "Commissioner of Patents, Washington, D. C."